United States Patent [19]

Markov et al.

[11] 4,172,304

[45] Oct. 30, 1979

[54] APPARATUS FOR FILLETING FISH

[76] Inventors: Vladimir F. Markov, ulitsa Chernyakhovskogo 74B, kv. 19; Boris F. Lavrentiev, Leninsky prospekt, 10, kv. 15; Arkady P. Semyanov, ulitsa Leonova, 44, kv. 11; Nikolai F. Slavinsky, ulitsa Proletarskaya 61, kv. 8; Konstantin V. Zubarev, ulitsa Klavy Nazarovoi, 41, kv. 6, all of Kaliningrad, U.S.S.R.

[21] Appl. No.: 910,652

[22] Filed: May 30, 1978

[51] Int. Cl.² .............................................. A22C 25/16
[52] U.S. Cl. ...................................................... 17/56
[58] Field of Search .......................... 17/56, 55, 57, 52

[56] References Cited

U.S. PATENT DOCUMENTS

| | | | |
|---|---|---|---|
| 3,309,730 | 3/1967 | Michael | 17/56 X |
| 4,037,294 | 7/1977 | Cowie et al. | 17/56 |

*Primary Examiner*—Willie G. Abercrombie
*Attorney, Agent, or Firm*—Burgess, Ryan and Wayne

[57] ABSTRACT

The apparatus for filleting fish comprises guiding flaps arranged in succession and a system of knives. Said guiding flaps are adapted for feeding and orienting the fish which travels in the process of treatment. Said system of knives consists of circular knives and two filleting knives. Said circular knives adapted for cutting out a strip of flesh on the bottom of the fish belly are disposed behind the guiding flaps. Said two filleting knives are mounted one opposite the other. Disposed between the cutting edges of said filleting knives and the circular knives is a flattener. Said filleting knives have a ring form and are mounted on carrying rollers. Said cutting edges of the filleting knives are set in the direction facing the movement of the fish and coaxially with the side surfaces of said flattener. Said side surfaces of the flattener have a cylindrical form in the zone of said cutting edges. The distance between said cylindrical surfaces of said flattener and said cutting edges of said ring knives corresponds substantially to a maximum thickness of the rib bones of the fish.

3 Claims, 9 Drawing Figures

APPARATUS FOR FILLETING FISH

FIELD OF THE INVENTION

The present invention relates to the fishing industry, and more particularly to apparatus for filleting fish used both at on-shore and floating fish processing factories.

DESCRIPTION OF THE PRIOR ART

The prior art describes a fish filleting machine (British Pat. No. 973,213, issued in Oct. 21, 1964, Cl. A2UI), comprising guiding flaps adapted for feeding and orienting the fish which travels in the process of treatment, circular knives for cutting the fish on the belly side and on the back side to the backbone, a plate-shaped support (flattener), two filleting knives having the form of an endless band. These endless band knives are disposed one opposite the other on each side of the fish and intended for filleting the belly flanks separated by the circular knives on each side of the rib bones. The apparatus incorporates means for conveying the fish during processing and for pressing its flanks against the flattener.

In the course of operation of the apparatus, the fish is fed into the guiding flaps with its beheaded end forward and its belly downward, wherefrom it is carried onto disc knives mounted in succession behind the guiding flaps. The circular knives cut the fish along its belly and its back side to the backbone, whereupon the fish is fitted on the flattener and travels to the filleting endless band knives and at the moment the fish passes between these knives, both halves of the belly are tightly pressed against the flattener so that the rib bones are brought between the endless band knives and the latter cut fillet off the fish (separate the fillet from the bones).

The known apparatus permits severing the fillet from fish, for example, herring, with maximum flesh by removing all the bones from the fish. However, the construction of the apparatus is complicated and bulky. The endless band knives are not reliable in operation owing to a frequent tearing of the band. In addition, the filleting apparatus is suitable for processing a narrow range of fish species, herring, for example. The operation of the apparatus does not ensure high quality of filleting due to a complicated structure of the device for pressing the belly flanks of the fish tightly against the flattener. If case press rollers are used, following the shape of the fish, only a narrow size range of fish can be processed. Another disadvantage of the apparatus is that the cutting of the fish with only a circular knife does not ensure a further removal of pinbones in the region of a belly.

SUMMARY OF THE INVENTION

It is an object of the invention to provide an apparatus for fish filleting whereby the construction of filleting knives and a flattener would ensure the production of a high quality of fillet, viz., the complete removal of the backbone, rib bones and dorsal fins.

Another object of the invention is to provide an apparatus for fish filleting which ensures an economical cutting of fillet.

A further object of the invention is to provide an apparatus for fish filleting which makes it possible to extend a species range and a size range of the fish to be processed.

A further object of the invention is to provide an apparatus for fish filleting which is simple in construction and reliable in operation.

The above objects are attained by providing an apparatus for fish filleting, comprising successively disposed guiding flaps for feeding and orienting fish which travels in the process of treatment, a system of knives comprising circular knives for cutting out a strip of flesh on the belly bottom of the fish mounted behind the guiding flaps, and two filleting knives arranged one opposite the other, between the cutting edges of which and the circular knives a flattener is provided. According to the invention, the filleting knives have a ring form and are mounted on carrying rollers, their cutting edges being set in the direction facing the movement of the fish and coaxially with the side surfaces of the flattener which have a cylindrical form in the zone of the cutting edges, the distance between the cylindrical surfaces of the flattener and the cutting edges of the ring knives corresponding substantially to a maximum thickness of the rib bones of the fish.

This kind of construction allows the filleting knives and the flattener to be arranged with consideration for the skeleton structure of the fish at its cross section, which enables the fish to be more securely centered and positioned at the moment of filleting, thereby providing the production of fillet substantially free of bones and with a maximum of flesh.

In addition, the ring form of the filleting knives makes the construction simple and reliable in operation.

It is practical that inside each ring knife an edge flange be provided for the purpose of mounting the ring knives on carrying rollers.

This allows, on the one hand, to mount the ring knives on carrying rollers which are in turn secured to the frame of the apparatus, and, on the other hand, the edge flange, being a kind of a thickened portion of the ring knife back surface cross section, provides stiffness of the ring knife.

The carrying rollers may be interconnected by a stiffener, and one of the carrying rollers may be spring-loaded to ensure a permanent contact of the rollers and the edge flange of the ring knife. This arrangement prevents the ring knives from a possible runout as well as provides a reliable contact of the ring knives and the carrying rollers, which in turn ensures a reliable transmission of a rotary motion from a drive roller to a ring knife.

The invention will now be described in greater detail with reference to a preferred embodiment thereof, taken in conjunction with the accompanying drawings, wherein.

Figure 2:
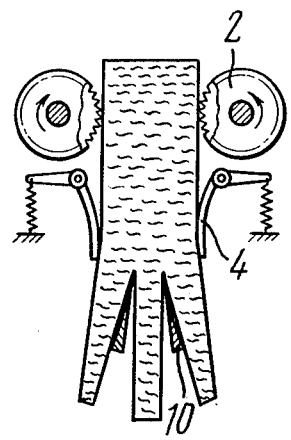
FIG. 2 is a cross-sectional view taken along the line II—II in FIG. 1 illustrating a fish filleting process, according to the invention.
Figure 3:
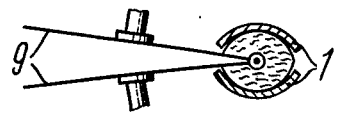
FIG. 3 is a cross-sectional view taken along the line III—III in FIG. 1, showing the position of the fish in guiding flaps and the beginning of cutting out a strip of flesh on the belly bottom of the fish by circular knives, according to the invention.
Figure 5:
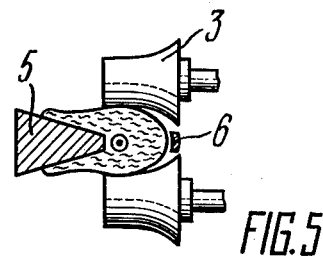
FIG. 5 is a cross-sectional view taken along the line V—V in FIG. 1 illustrating the process of placing and conveying the fish over a flattener, according to the invention.
Figure 4:
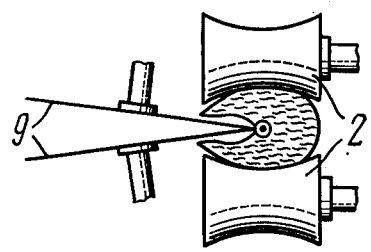
FIG. 4 is a cross-sectional view taken along the line IV—IV in FIG. 1 showing a position of the fish being carried and an operation of cutting out the belly of the fish, according to the invention.
Figure 6:
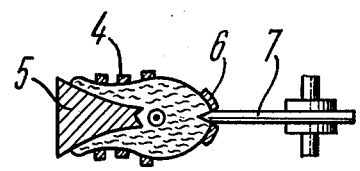
FIG. 6 is a cross-sectional view taken along the line VI—VI in FIG. 1 illustrating a process of conveying the fish and of pressing the flanks of the fish against the flattener, according to the invention.
Figure 7:
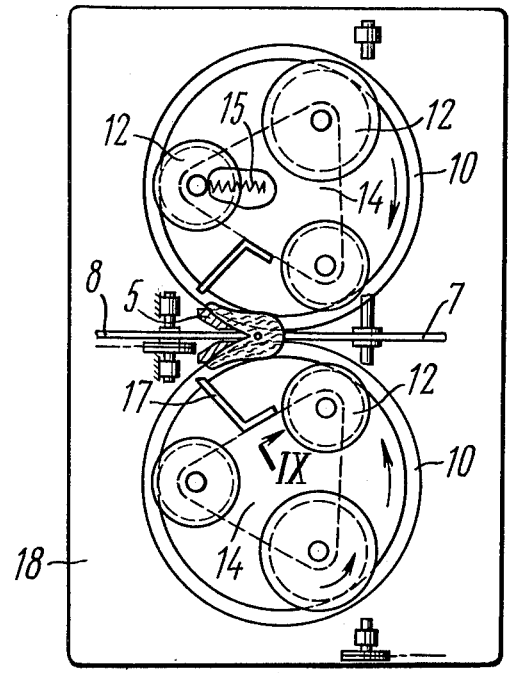
FIG. 7 is a cross-sectional view taken along the line VII—VII of FIG. 1 showing a position of the fish relative to filleting knives, and an arrangement of carrying rollers, according to the invention.
Figure 8:
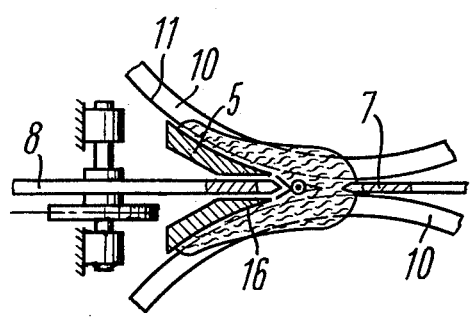
FIG. 8 is an enlarged partial view of section taken along the line VII—VII of FIG. 7.
Figure 9:
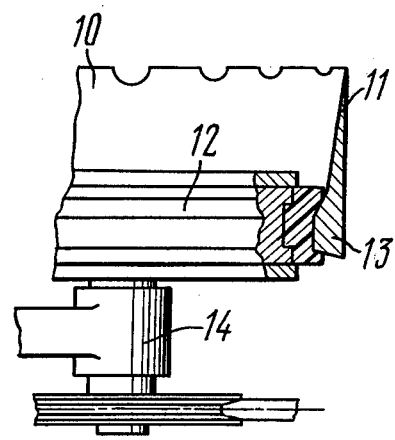
FIG. 9 is a sectional view taken along the line IX of FIG. 7, showing a cross section of a ring knife (its edge flange) and a drive roller, according to the invention.

An apparatus for filleting fish comprises guiding flaps 1 (FIGS. 1, 3) for feeding and orienting the fish. The fish is conveyed while being processed by means of conveying and centering elements. These elements include two pairs of profiled grooved rollers 2 and 3 (FIGS. 1, 2, 4, 5) of drive, sectorally-connected, spring-loaded kinds, diagrammatically shown in the drawings, pressing plates 4 (FIGS. 1, 2, 6) adapted for tightly pressing the belly flanks against the side surfaces of a flattener 5 (FIGS. 1, 5, 6, 7, 8), a spring-loaded holder 6 (FIGS. 1, 5, 6) intended for the fish backbone to be fitted on the top of the flattener 5 (FIGS. 1, 5, 6, 7, 8) and toothed discs 7 and 8 (FIGS. 1, 6, 7, 8) adapted to displace the fish during filleting process. The machine includes a system of knives, consisting of circular knives 9 (FIGS. 1, 3, 4) for cutting out a strip of flesh on the belly bottom of the fish which are disposed in succession behind the guiding flaps and at an angle of 8°–10° to each other and two filleting knives 10 (FIGS. 1, 2, 7, 8, 9) mounted one opposite the other, between the cutting edges 11 (FIGS. 8, 9) of which and the circular knives 9 (FIGS. 1, 3, 4) the flattener 5 is arranged (FIGS. 1, 5, 6, 7, 8). The filleting knives 10 (FIGS. 1, 2, 7, 8, 9) have a ring form and are mounted on carrying rollers 12 (FIGS. 7, 9). In order to avoid jamming of a part of the fish, having bones, the filleting ring knives are tapered at the outside surface thereof at an angle of 4°–6°. The cutting edges 11 (FIGS. 8, 9) of the ring knives 10 are set in the direction facing the movement of the fish and coaxially with side surfaces 16 (FIG. 8) of the flattener 5 (FIGS. 1, 5, 6, 7, 8). The side surfaces 16 (FIG. 8) of the flattener 5 (FIGS. 1, 5, 6, 7, 8) have a cylindrical form in the zone of the cutting edges 11 (FIGS. 8, 9). The distance between the cylindrical surfaces (FIG. 8) of the flattener 5 (FIGS. 1, 5, 6, 7, 8) and the cutting edges 11 (FIGS. 8, 9) of the ring knives 10 (FIGS. 1, 2, 7, 8, 9) corresponds substantially to a maximum thickness of the fish rib bones.

Inside each ring knife 10, an edge flange 13 (FIG. 9) is provided for mounting the ring knife 10 (FIGS. 1, 2, 7, 8, 9) on the carrying rollers 12 (FIGS. 7, 9).

The carrying rollers 12 are interconnected therebetween by means of a stiff element, for example a roller bracket 14. One of the carrying rollers 12 is spring-loaded by a spring 15 (FIG. 7) for providing a permanent contact of the rollers and the edge flange 13 (FIG. 9) of the ring knife 10 (FIGS. 1, 2, 7, 8, 9).

Figure 1:
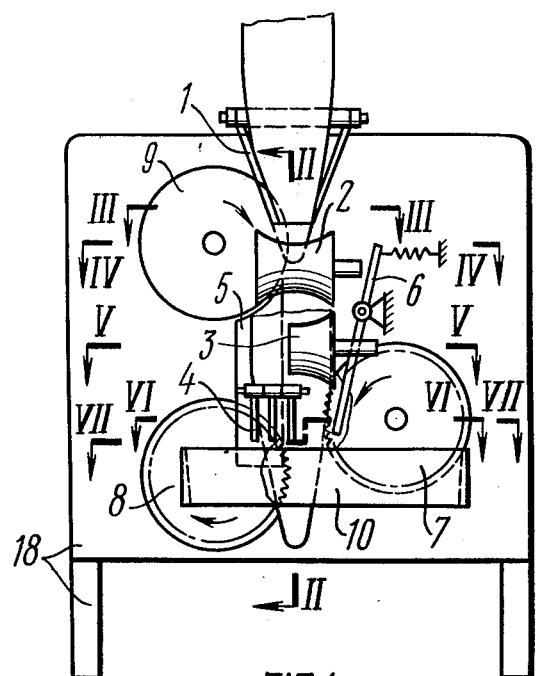
FIG. 1 is a diagrammatic representation of a fish filleting apparatus according to the invention.

The apparatus also includes guiding chutes 17 (FIG. 7) for directing cut-off fillets onto receiving troughs (not shown in the drawing). All the units of the apparatus are mounted on a frame 18 (FIGS. 1, 7).

The operation of the fish filleting apparatus is effected as follows:

FIsh, beheaded and gutted with the caudal fin removed is fed (FIG. 1) with its tail end or its head portion first to the guiding flaps 1 (FIG. 1) (the figure shows the fish being fed with its tail end forward), whereupon the fish is caught by the conveying rollers 2 which carry it onto the flattener 5. Before the fish is placed onto the flattener 5, the circular knives 9 cut out a strip of flesh on the belly bottom of the fish, which enables the fish to be placed with its backbone on the flattener 5.

The fish is further caught by the feeding rollers 3 and is brought to the filleting knives 10, the belly flanks of the fish being tightly pressed against the side surfaces 16 (FIG. 8) of the flattener 5 (FIG. 1), with the pressing plates 4. In order to provide a more reliable conveying of the fish in the operating zone of the ring knives 10, the part of the fish, having bones, which is to be cut out, is gripped on both sides with the toothed discs 7 and 8.

As the fish is pushed on between the ring knives 10, mounted on the carrying rollers 12 by means of the edge flange 13 (FIG. 9), the operation of cutting off fillet halves from each side of the fish by the cutting edges 11 and the separation of the fillets from a backbone and rib bones is effected. These fillets are delivered by the chutes 17 (FIG. 7) to the space between the carrying rollers 12 mounted on the roller bracket 14, and are directed away from the apparatus.

Then the cycle is repeated.

What is claimed is:

1. An apparatus for filleting fish comprising:
   guiding flaps for feeding and orienting the fish which is moved in the process of treatment;
   circular knives and two filleting knives combined in a system of knives, designed for processing the fish during a filleting operation;
   said circular knives being arranged for cutting out a strip of flesh on the belly bottom of the fish and disposed in succession behind said guiding flaps;
   carrying rollers;
   said two filleting knives of said system being arranged for cutting off fillets from a fish, said filleting knivs having a ring form and being mounted on said carrying rollers one opposite the other;
   cutting edges of said ring knives being set in the direction facing the movement of the fish;
   a flattener for flattening out the belly flanks and guiding the fish to said ring knives interposed between said cutting edges of said ring knives and said circular knives, said flattener having side surfaces of a cylindrical form in the zone of said cutting edges and mounted coaxially therewith;
   the distance between cylindrical surfaces of said flattener and said cutting edges of said ring knives corresponding to a maximum thickness of rib bones of a fish; and
   means for conveying a fish through said system of knives.

2. An apparatus according to claim 1, wherein inside each said ring knife an edge flange is provided, adapted for mounting said ring knife on said carrying rollers.

3. An apparatus according to either of claims 1 or 2, wherein said carrying rollers are interconnected by means of a stiff element and one of said carrying rollers is spring loaded for provision of a permanent contact of said carrying rollers with said flange of said ring knife.

* * * * *

UNITED STATES PATENT AND TRADEMARK OFFICE
CERTIFICATE OF CORRECTION

PATENT NO. : 4,172,304
DATED : October 30, 1979
INVENTOR(S) : Vladimir F. Markov, et al It is certified that error appears in the above—identified patent and that said Letters Patent is hereby corrected as shown below:

In the Abstract, lines 2, 4, 5, 8, 10, 12, 14: change "Said" to --The--.

lines 14, 15, 16 and 17 (each occurrence): change "said" to --the--.

Column 4, line 3: "FIsh" should be --Fish--.

line 43: "knivs" should be --knives--.

Signed and Sealed this

Sixth Day of May 1980

[SEAL]

Attest:

SIDNEY A. DIAMOND

Attesting Officer     Commissioner of Patents and Trademarks